United States Patent
Roth

(10) Patent No.: US 10,501,268 B2
(45) Date of Patent: Dec. 10, 2019

(54) REFERENCED FEEDING OF CAPSULES

(71) Applicant: SIDEL ENGINEERING & CONVEYING SOLUTIONS, Reichstett (FR)

(72) Inventor: Emmanuel Roth, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 15/741,121

(22) PCT Filed: Jul. 31, 2015

(86) PCT No.: PCT/EP2015/067630
§ 371 (c)(1),
(2) Date: Dec. 29, 2017

(87) PCT Pub. No.: WO2017/020923
PCT Pub. Date: Feb. 9, 2017

(65) Prior Publication Data
US 2018/0194572 A1    Jul. 12, 2018

(51) Int. Cl.
*B65G 47/14* (2006.01)
*B67B 3/062* (2006.01)

(52) U.S. Cl.
CPC .......... *B65G 47/1471* (2013.01); *B67B 3/062* (2013.01)

(58) Field of Classification Search
CPC ................................................ B65G 47/1471
See application file for complete search history.

(56) References Cited

U.S. PATENT DOCUMENTS

| | | | | | |
|---|---|---|---|---|---|
| 2,745,537 | A | * | 5/1956 | Cadman | B65G 47/1471 198/397.01 |
| 3,070,210 | A | * | 12/1962 | Woodward, Jr. | B65G 47/1471 198/397.01 |
| 3,292,249 | A | * | 12/1966 | Banke | B21D 51/446 193/29 |
| 3,556,282 | A | * | 1/1971 | Moeltzner | B65G 47/1471 198/397.01 |
| 4,735,343 | A | | 4/1988 | Herzog | |

(Continued)

FOREIGN PATENT DOCUMENTS

DE   10 2008 057 902 A1   5/2010
EP       2 588 394 A1      5/2013

(Continued)

OTHER PUBLICATIONS

International Search Report, dated Apr. 8, 2016, from corresponding PCT application No. PCT/EP2015/067630.

*Primary Examiner* — William R Harp

(57) ABSTRACT

Disclosed is a device for feeding capsules, including a receiving tray for loose capsules, a raising belt provided with mountings, for circulating capsules upwards, during which the capsules that are incorrectly oriented are returned to the receiving tray, an outlet chute for guiding the capsules to the station being fed, as well as an ejection unit for guiding the capsules into the chute from one side of the raised belt. The chute includes an end portion wherein the capsules circulate under their own inertia and which has a guiding curve with nothing directly opposite, defining the path thereof. Also disclosed is a corresponding method.

11 Claims, 1 Drawing Sheet

(56) References Cited

U.S. PATENT DOCUMENTS

| | | | |
|---|---|---|---|
| 5,394,972 A | 3/1995 | Aidlin et al. | |
| 5,586,637 A * | 12/1996 | Aidlin | B65G 47/1471 198/396 |
| 7,040,489 B2 * | 5/2006 | Zemlin | B65G 47/1471 198/384 |
| 7,246,695 B2 * | 7/2007 | Zemlin | B65G 17/12 198/397.06 |
| 7,850,403 B2 | 12/2010 | Lorange et al. | |
| 7,972,088 B2 | 7/2011 | Dotson et al. | |
| RE45,025 E * | 7/2014 | Evers, Jr. | B65G 47/1471 198/393 |
| 8,783,439 B2 | 7/2014 | Lopez et al. | |

FOREIGN PATENT DOCUMENTS

| | | |
|---|---|---|
| WO | 2006/045927 A1 | 5/2006 |
| WO | 2006/045928 A1 | 5/2006 |

\* cited by examiner

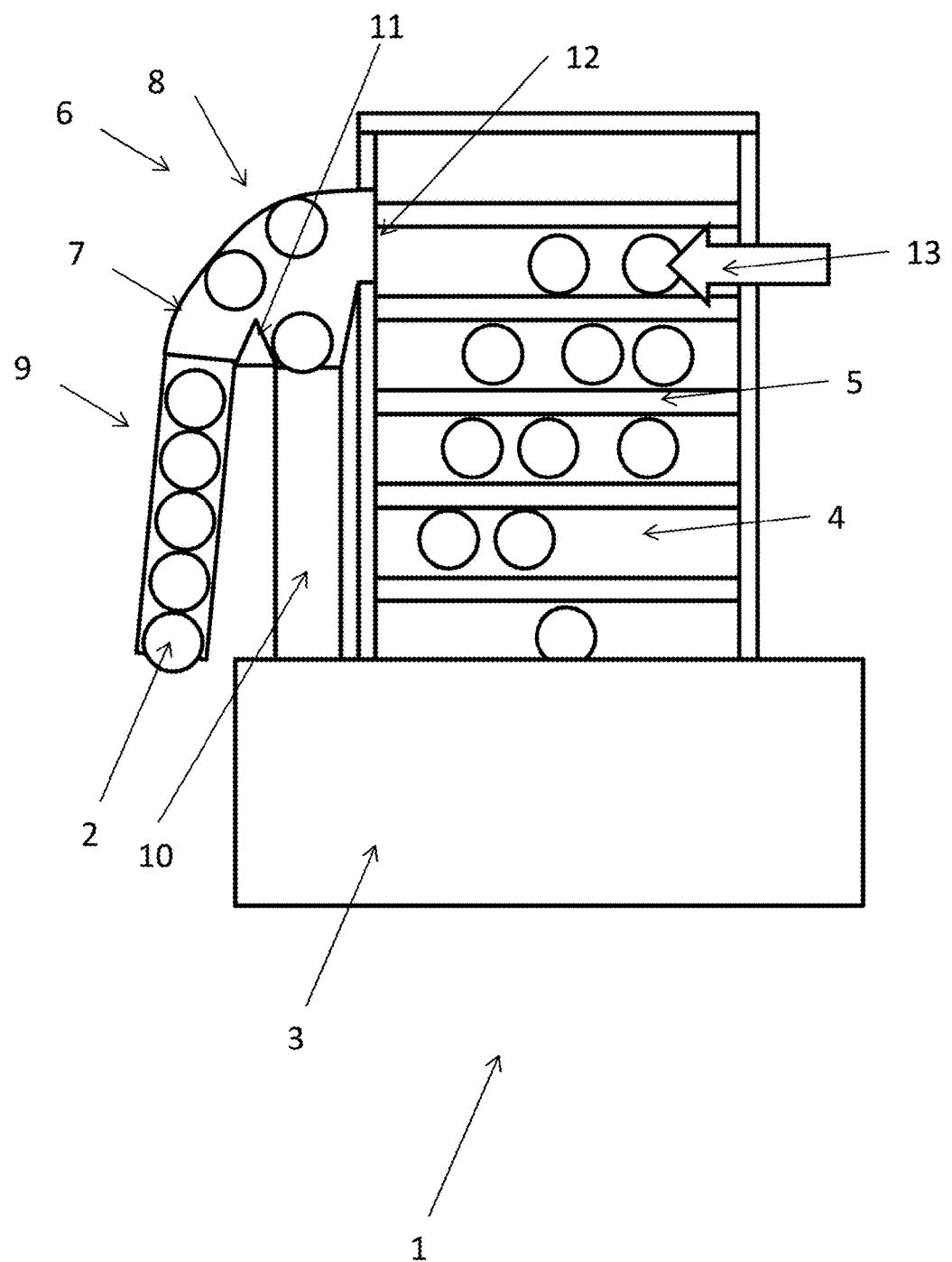

REFERENCED FEEDING OF CAPSULES

TECHNICAL FIELD

This invention pertains to the field of liquid container packaging, and it has as its object, on the one hand, a device for supplying capping capsules, and, on the other hand, a method that uses this device.

The liquid packaging industrial lines comprise a capping step, during which process a capsule, cap, or other capping element is put on the filled bottle.

BACKGROUND OF THE INVENTION

As, for example, U.S. Pat. No. 5,394,972 describes it, these capsules are generally provided by a feed device that comprises a hopper in which a supply of loose capsules is located. A belt that circulates essentially vertically will then take capsules to the bottom of this hopper and guide them upward, where they are then released. Only the properly-oriented capsules, i.e., with a bottom against the belt, are guided to the outlet zone. Such a device is equipped, vertically, with an opening through which the capsules are then sent into a channel and on to the sealing device.

U.S. Pat. No. 4,735,343 discloses such a device, equipped with an oblique slide plate that pushes to the side the capsules at the end of the path that they travel through the outlet zone. One of the drawbacks is that jamming can occur at high speed or when the slide plate has so small an angle that the space requirement in height is too high.

WO2006045928 proposes a configuration where the capsules are ejected from the belt by a grazing air stream, and then are conveyed still further with such a stream created by a box that then forms an air conveyor. The capsules rely on a smaller bend that ensures the guiding thereof. One of the drawbacks is the necessity of constantly supplying this device with energy. In addition, an air stream carries dust and can therefore not meet certain hygiene or noise requirements.

WO2006045927 proposes a principle where a gradual restriction, of the funnel type, is provided in the area of the chute downstream from the belt. The movement of the capsules is caused by an air stream. One of the drawbacks of such a funnel is the high risk of jamming when the operating rates are high.

In the state of the art, there is therefore a need to improve this type of capping device for supplying capsules, in particular in the area of the outlet of the belt, by proposing a reliable and economical solution for supplying correctly-oriented capsules at a high operating rate.

SUMMARY OF THE INVENTION

To resolve this problem, the invention proposes ensuring a centrifugal referencing of capsules that are ejected away from the belt, owing to a curved guiding profile against which they can be flattened behind one another.

The invention thus has as its object a device for supplying capsules, comprising a receiving tray for loose capsules, a rising belt that is equipped with mountings, for the purpose of conveying capsules upward, during which process the poorly-oriented capsules are sent back toward the receiving tray, an outlet chute for guiding the capsules to the station that is being fed, as well as an ejection means for guiding the capsules into said chute from a side of the raised belt.

This device is characterized in that
the chute comprises, on the belt side, an end part where the capsules are conveyed under the action of their inertia and that has a guiding bend with nothing opposite, defining their path there, in particular defining their path upward.

The invention also has as its object a method used this device, namely a method for supplying capsules in a processing station, comprising the steps that consist essentially in raising the capsules by conveying by means of a belt that is equipped with mountings, during the raising, eliminating the poorly-oriented capsules, at the end of the raising, releasing the capsules from the belt toward a channel of a chute, conveying the capsules within the channel upward to the processing station.

This method is characterized in that releasing the capsules toward the channel essentially consists in letting them move freely after the belt and up to the channel, along a path that is defined at least partially by a guiding bend.

BRIEF DESCRIPTION OF THE DRAWING

The invention will be better understood owing to the description below, which is based on possible embodiments, explained in a way that is illustrative and in no way limiting, with reference to the accompanying FIGURE, which shows a diagram of a device in accordance with the invention.

DESCRIPTION OF THE PREFERRED EMBODIMENTS

The invention thus has first of all as its object a device 1 for supplying capsules 2, comprising a receiving tray 3 for loose capsules 2, a rising belt 4 that is equipped with mountings 5, for the purpose of conveying the capsules 2 upward, during which process the poorly-oriented capsules 2 are sent back toward the receiving tray 3, an outlet chute 6 for guiding the capsules 2 to the station that is being fed, as well as an ejection means 13 for guiding the capsules 2 into said chute 6 from a side of the raised belt 4.

The mountings 5 make it possible for the belt 4 to carry the capsules 2 upward, with the mountings 5 forming for them a lower support surface. The capsules 2 can, of course, be of varied shapes with each processing cycle. The raising by the belt 4 makes it possible for poorly-oriented capsules 2 to fall back into the receiving tray 3. The properly-oriented capsules 2, with their bottom closed against the belt 4, are thus carried by the belt 4 up to an outlet opening 12. This outlet opening 12 is in the top part of the feed device 1 and on one side. The capsules 2 are pushed until they travel through this opening 12 to be released from the belt 4. The path of the capsule 2 then depends on its initial position on the belt 4, namely between the edge where the opening 12 is put in, which corresponds to the shortest path, and the opposite edge, which corresponds to the longest path.

An ejection means 13 then exerts the force that is required on the capsules 2 to carry them to said outlet opening 12. It may be a means of creating mechanical thrust by contact with a pusher-type element, or else by an air stream, etc.

According to the invention, the chute 6 comprises, on the belt side 4, an end part 7 where the capsules 2 circulate under the action of their inertia and that has a guiding bend 8 with nothing opposite, thus defining their path and in particular defining their path upward, with the bend 8 then forming the above-referenced guiding up to the channel 9. The end part 7 is mounted in the area of the opening 12, and the capsules 2 therefore circulate there directly after having been ejected from the belt 4. The chute 6 preferably extends downward after the end part 7, from the opening 12 that is located above, the end part 7 then forming an upper part 7. In other applications, the chute 6 rises directly after the end part 7. According to the configurations, the inlet of the channel 9, starting from which the bend 8 extends, is therefore higher or lower than the outlet opening 12.

Downstream from the circulation owing to the belt 4, the capsules 2 circulate, after their travel through the opening 12, into the chute 6, which preferably guides them lower, in such a way that the circulation of the capsules 2, at least at the beginning of the chute 6, can be done without artificial motor means. The sole gravity source can then be enough to move them within the chute 6. The capsules 2 are thus preferably released after their forced ejection from the belt 4 and freely continue on their way under the action of their inertia and gravity. The feed device 1 preferably has no means for driving capsules 2 directly downstream from the opening 12, in the upper part 7 of the chute 6, upstream from the channel 9.

The speed of the capsules 2 at the outlet of the belt 4, caused by the ejection means 13, guides them against the bend 8, which will ensure a guiding thereof up to the channel 9, with the latter having dimensions that are corresponding and complementary to the capsules 2 and thus ensures a good guiding thereof up to the next station. The inlet of the channel 9 is preferably below relative to the opening 12, with the bend 8 then being positioned to extract the capsules 2 toward said inlet, in particular in the cases where the capsules 2 are moving too fast and would go too far relative to the inlet of the channel 9 in the absence of such a bend 8.

In these embodiments, the bend 8 is therefore above capsules 2. It extends approximately from the top of the opening 12. The reverse embodiments are also possible, with a channel inlet 9 located higher than the opening 12: in this case, the bend 8 is under the path of the capsules 2, i.e., it extends approximately from the bottom of the opening 12.

The inertia of the capsules 2 guides them against the bend 8, which makes it possible to obtain therefrom the referencing in the necessary position before the inlet of the channel 9. Since the feed device 1 does not have guiding opposite the bend 8, which reaches one edge of the channel 9, the capsules 2 that are not against it quite simply cannot enter into the channel 9. This ensures the natural and fluid creation of a single-line column of the above-referenced capsules 2 by preventing blockages.

Thus, in certain embodiments, the bend 8 assumes the shape of an arch, preferably downward from an outlet opening 12 up to the inlet of the channel 9, below, in such a way as to guide the capsules 2 against it up to the inlet of the channel 9. The bend 8 is preferably arched to prevent the capsules 2 from bouncing off when they come into contact against the bend 8. The bend 8 can, for example, follow an arch whose shape corresponds to the profile of a free drop, so as to match at a maximum a natural path of the capsule 2 between the opening 12 and the inlet of the channel 9.

In certain embodiments, the profile of the bend 8 extends along, and even above, the path that an object such as a capsule 2 would follow, under the sole action of gravity, between the outlet of the belt 4, where it has the necessary horizontal speed, and the inlet of the channel 9, below and separated horizontally in relation to said outlet, with the latter being formed by the opening 12. Thus, if a capsule 2 has a horizontal speed that is greater than the required minimal speed, it is in theory guided by the bend 8 from the beginning. It will be understood that the normal drop path under the action of the gravity between the opening 12 and the inlet of the channel 9 does not depend in an essential way on the capsule 2 itself, but primarily on the relative position of said opening 12 and said inlet of the channel 9.

As has already been mentioned, according to a possible additional characteristic, the chute 6 has, downstream from the end part 7, a channel 9 with a shape that is suitable for capsules 2 for preserving the orientation thereof during their circulation, with the bend 8 extending starting from said channel 9. The capsules 2 that are referenced naturally against the bend 8 are then guided into the channel 9, with the bend 8 therefore extending from one edge of the channel 9. In other words, one edge of the channel 9 extends toward the opening in the form of a guiding bend 8, whereas the edge opposite stops. The circulation of the capsules 2 in the channel 9 can be motorized or not.

The channel 9 has a passage section that is adapted to the capsules 2, for a single-line circulation, thereby making it possible to keep the capsules 2 from changing orientation.

According to another possible additional characteristic, the feed device 1 has an unloading flow 10, extending from the end part 7 of the chute 6, for receiving and releasing from said end part 7 the capsules 2 that are not opposite the channel 9, with the latter having, at its end in the area of the end part 7 of the chute 6, a separator 11 that can divert the capsules 2 toward said unloading flow 10.

The unloading flow 10 preferably guides the capsules 2 that are poorly positioned in relation to the channel 9, and therefore not directly against the bend 8, again in the receiving tray 3. The inlet of the channel 9 is therefore provided with a point, or separator 11, which has an acute angle. This separator 11, of the point or diverter type, is therefore located starting from the wall of the channel 9 that is opposite to the one from which the bend 8 extends. In the unloading flow 10, this separator 11 diverts the capsules 2 that are not against the bend 8. The acute angle contributes to preventing jamming and promotes fluid circulation.

The capsules 2 on which the separator 11 is to act as a diverter can be offset in relation to the channel 9 following a saturation of the channel 9, for example. Another reason may be that there is too large a number of capsules 2 in the end part 7, which leads the capsules 2 in this part to be organized in more than one column against the bend 8. Too low a speed of the capsule 2 can also keep it from reaching the bend 8 before the inlet of the channel 9.

In accordance with what has already been described, according to a possible additional characteristic of the feed device 1, it has a raised outlet opening 12, through which the capsules 2 travel after they are carried on the belt 4 and starting from which the chute 6 extends, with the ejection means 13 acting on the capsules 2 in the area of the belt 4 so that they pass through said opening 12 and then circulate freely up to the inlet of the channel 9, guided by the bend 8, and in particular fall into the channel 9, optionally owing to the guiding of the bend 8. The action of the ejection means 13 can be mechanical by thrust or optionally by air pressure. The circulation of the capsules 2 in the end part 7, or the upper part 7, is therefore done without the action of a controlled means for a putting into motion. Only the gravity and even the bend 8 have an effect on the path and the speed of the capsules 2. They are no longer carried by the feed device 1 between the opening 12 and at least the channel 9, downstream from the end part 7.

The invention also has as its object a method that is implemented by the device that is described above, namely a method for supplying capsules 2 into a processing station, comprising the steps that consist essentially in raising the capsules 2 by a circulation by means of a belt 4 that is equipped with mountings 5, during the raising, eliminating the poorly-oriented capsules 2, at the end of the raising, releasing the capsules 2 from the belt 4 toward a channel 9 of a chute 6, circulating the capsules 2 within the channel 9 up to the processing station.

According to the invention, releasing the capsules 2 to the channel 9 essentially consists in allowing them to move freely after the belt 4 and up to the channel 9, along a path that is defined at least partially by a guide bend 8, in particular a bend that defines the path by the top and/or with nothing opposite. During the ejection of capsules 2 away from the belt 4, it is therefore a matter of said capsules 2 moving fast enough so that they effectively reach the inlet of the channel 9, downstream from the end part 7. If the capsules 2 have a higher speed, they come against the bend 8, which then guides them upward to the inlet of the channel 9. The capsules 2 therefore do not need to be forced mechanically against the reference surface that the bend 8 forms, since they go there naturally under the action of their inertia. The inertia of the capsules 2 represents a high enough force to obtain this referencing against the bend 8, but low enough not to cause jamming if the capsules 2 form more than one simple single-line column.

Thus, according to a possible additional characteristic, the speed of the capsules 2, during their release toward the chute 6, is such that they come against the bend 8 at least for a part of their path, in such a way as to obtain a positional referencing. The ejection means 13 is therefore consequently controlled.

In certain embodiments, the capsules 2 are released toward the channel 9 by exerting on them an essentially horizontal thrust from the zone of the belt 4 up to a raised outlet opening 12, with the capsules 2 then circulating freely under the action of gravity up to the channel 9, preferably below, optionally guided by the bend 8. This thrust is therefore transverse to the advance of the belt 4 and goes from one side of said belt 4 to the other. In absolute terms, since the belt 4 is moving constantly, the capsules 2 have, in relation to the floor, a speed with, in addition to a component that is transverse to the direction of the belt 4, a component that is parallel to the direction of the belt 4, owing to the elevation of the belt 4 itself.

This speed component is essentially vertical and is significantly smaller than the horizontal component of the speed.

According to another possible additional characteristic, the horizontal thrust of the capsules 2 and the vertical rise of the belt 4 are proportional and, during operation, greater than a respective lower threshold above which the capsules 2 circulate against at least one part of the bend 8. Actually, in some embodiments, the ejection means 13 comprises a pusher-type solution, having to circulate between the mountings 5 and therefore having to exhibit a movement that is also partially vertical, along the elevation of the belt 4. The horizontal separation between, on the one hand, the opening 12 and, on the other hand, the opening of the channel 9 contributes to defining a minimum horizontal speed for the capsules 2 after the opening 12, below which the capsules 2 do not reach said channel 9. In the cases where the speed of the capsules 2 leaving the belt 4 is that of the ejection means 13 that pushes them, said ejection means 13 is to move with a minimum horizontal speed. Since the movement of this ejection means 13 is coordinated with the movement of advance of the belt 4, taking into account mountings 5 between which it is to circulate, there is therefore also a minimum speed of advance of the belt 4, below which, ultimately, the capsules 2 will probably not reach the channel 9.

Finally, according to another possible additional characteristic, the method also comprises a step that consists, downstream from the belt 4, in sending back toward an unloading flow 10 the capsules 2 that are detected as not meeting an inherent predefined criterion of speed and/or orientation, so that they will not be brought to the station that is normally being fed. It may actually be that poorly-oriented capsules 2 will pass through the outlet opening 12, in particular for the configurations where the belt 4 is short due to the problems of vertical space required. In addition, compliance tests can be put into place for detecting a capsule 2 that would not be inherently compliant when it is to be released by the belt 4, for example a capsule that is missing a ring or one that is incomplete.

For these cases, the method has a step where the flow of capsules 2 can be directed toward an unloading flow 10 rather than toward the channel 9 that is connected to the station that is being fed. It is thus possible to avoid sending defective capsules 2 to the station that is being fed. The unloading flow 10 can simply be connected to the hopper 3. The unloading flow 10 and the channel 9 both extend in parallel from the end part 7, from the separator 11.

The invention will now be explained with reference to the accompanying FIGURE.

In FIG. 1, the feed device 1 processes capsules 2 or caps that will be placed on a container such as a bottle, carton, etc. This type of capsule 2, which can generally be opened by unscrewing, therefore often has a disk-shaped bottom from which extends a circumferential wall, inside of which there is a threading. This capsule 2 can then be screwed directly onto the open end of a bottle. The base that is complementary to this threading can also be provided directly on the capsule 2, as for applications where the capsule 2 is then bonded to a carton.

These capsules 2 are therefore sent via the feed device 1 to a station of the sealing-device type, which can also provide bottle-labeling or else bottle-filling functions. It is important that the capsules 2 be correctly oriented, in compliance with the configuration of the station that is being fed by the feed device 1. One of the roles of the feed device 1 is to ensure that the capsules 2 that it provides always have the orientation that is predefined for the station that uses them.

To do this, the feed device 1 is equipped with a continuous belt 4, circulating in an essentially vertical direction. This belt 4 is equipped with successive mountings 5 that preferably assume the shape of wedges that extend transversely to the direction of advance of the belt 4. These wedges or mountings 5 mechanically carry a set of capsules 2 when they circulate in the receiving tray 3 where a set of loose capsules 2 is located.

The belt 4 is oriented in such a way that the capsules 2 whose bottoms are not against the belt 4 drop into the receiving tray 3 under the action of gravity. It is therefore by making the poorly-oriented capsules 2 drop into the receiving tray 3 that the feed device 1 ensures a selection function that makes it possible to send only correctly-oriented capsules 2. This selection is therefore made during the raising of capsules 2 by the belt 4. The feed device 1 is thus provided, raised after a circulation of the belt 4 from the hopper 3, with an opening 12, set on the side of the belt 4, and through which the capsules 2 pass, after having been raised by the belt 4 to this height. Normally, at the height of the opening 12, the belt 4 transports only correctly-oriented capsules 2, i.e., with their bottoms closed against the belt 4. Since the belt 4 advances continuously even when the capsules 2 are released therefrom, this lateral opening 12 has, in the direction of advance of the belt 4, a larger dimension than that of the capsules 2. The capsules 2 therefore arrive in the chute 6 from various heights along the path of the belt 4. One of the reasons for this distribution in this direction is also that the capsules 2 are located in various locations between the two longitudinal edges of the belt 4 and that the distance that they must travel to reach the outlet opening 12 is different for each of them.

The feed device 1 is equipped with an ejection means 13 that pushes the capsules 2 through the outlet opening 12. This ejection means 13 can be a stream of air that is transverse to the advance of the belt, a pusher, or other means of action.

A chute 6 is mounted on the opening 12 that is set in raised form in the feed device 1, in such a way that the capsules 2, pushed transversely by the ejection means 13 in the direction of and through the lateral opening 12, continue their travel into said chute 6. This chute 6 is preferably connected, directly or not, at the inlet of the station that is to be fed. The capsules 2 travel there under the action of gravity or under the action of a drive means, which can be a strap, for example.

The chute 6 has a flow channel 9 whose passage section corresponds to the shape of the capsules 2 that are being processed, which makes it possible in particular to keep the capsules 2 from pivoting around the axis along which the channel 9 extends. The adjustment between, on the one hand, the section of the channel 9, and, on the other hand, the shape of the capsules 2, therefore ensures that the capsules 2 that are correctly oriented at the top of the belt 4, in the area of the outlet opening 12, maintain their orientation up to the station that is being fed.

This channel 9 can assume various shapes, such as, for example, a guide channel 9 that is hollow over its entire length, a channel that is defined by closed walls, or else a channel 9 that is defined by retaining rings that are positioned on successive plates along the channel 9, etc.

The capsules 2 therefore circulate in the channel 9 behind one another, in a single line. The capsules 2 therefore shift from a position that is not completely controlled at the outlet of the belt 4 to a position that is controlled in the area of the channel 9. To avoid the jamming that is inherent in a gradual positioning by means of a narrowing in the form of a corner or funnel, it is proposed here that the capsules 2 be ejected away from the belt 4 at a high enough speed that they are flattened against a bend 8 that will then guide them up to the inlet of the channel 9, with their speed making it possible for them to preserve their referencing against the bend 8.

Thus, the chute 6 is provided with an end part 7 that comes between the guided conveying channel 9 and the lateral opening 12 through which the capsules 2 circulate when they are released from the belt 4. In a preferred way, the chute 6 brings the capsules 2 toward a lower level than the opening 12; the end part 7 is therefore the highest portion of the chute 6, with the channel 9 being located below. This end part 7 is used in adaptation between the lateral opening 12 and the channel 9. The feed device 1 then has a curved guide, or bend 8, put into the upper end part 7 of the chute 7 that, with nothing opposite to prevent the jamming, defines the path of the capsules 2 between the outlet of the raised belt 4 and the inlet opening of the channel 9, located lower.

In the area of this end part 7, the capsules 2 circulate with their essentially horizontal axis of symmetry, with their bottoms, in solid disk form, resting against a sliding surface that is essentially vertical. The capsules 2 are therefore guided to circulate in a housing that is defined by two opposite faces, perpendicular to the axis of symmetry of the capsule 2 and therefore essentially vertical, as well as the bend 8, with the latter having nothing opposite up to the channel 9, and more particularly up to its inlet, where there is a separator 11.

In the cases that are preferred since they consume little energy, where gravity makes the capsules circulate downstream from the opening 12 and in the chute 6, the latter empties into a means for taking up capsules 2 that the feed device 1 comprises. It can, for example, involve a driving wheel for selection, transfer and/or complementary orientation of the capsules 2, which receives the capsules 2 one at a time and carries them further, for example on a motorized notched belt.

The capsules 2 are released from the belt 4 transversely, by means of the ejection means 13, and therefore have, during their passage through the opening 12 above to end in the end part 7 of the chute 6, a non-zero horizontal speed, it being understood that the ejection means 13 exerts on the capsules a speed that is transverse to the advance of the belt 4 and therefore essentially horizontal. It will be noted that in the cases where the ejection means 13 is of the pusher type, synchronization between the longitudinal movement of the belt 4 and the corresponding movement of the belt 4 is possible. Thus, in a general way, under the action of the ejection means 13, the capsules 4 are driven, in relation to the belt 4, by a movement that is transverse to its advance, which means that the capsules 4 are driven at a speed, in relation to the floor, that is not only horizontal but also with a component in the direction of advance of the belt 4. This further also explains the necessity for a raised outlet opening 12 that extends in the direction of advance of the belt 4, whereas the downstream channel 9 has a passage section that is adjusted to the capsule 2.

The end part 7 of the chute 6, mounted against the outlet opening 12, has a guide bend 8 that is oriented downward, preferably extending from the opening 12 up to the opening of the channel 9. This bend 8 is opposite to the movement of the capsules 2 in the end part 7 and brings them up to the channel 9.

Once released from the belt 4, the capsules 2 are free and continue their movement under the action of their inertia. The feed device 1 is actually lacking an action means carrying the capsules 2 between the outlet opening 12 of the belt 4 and at least one opening of the channel 9. The bend 2 is such that the capsules 2 come into its contact when they freely continue their movement, taking into account their inertia and being under the action of gravity, following the movement caused by the feed device 1 to release them from the belt 4.

The bend 2 is also preferably such that it prevents a rebound of the capsules 2 upon contact. Preferably, the profile of the bend 2 therefore approximately follows the shape of a free-fall curve with an initial horizontal speed. The capsules 2 that are too fast are therefore extracted by the bend 8, downward, in the direction of the inlet of the channel 9, below in relation to the raised opening 12 set on the side of the belt 4.

The bend 8 therefore ensures a referencing of the capsules 2, since the former come into its contact and it is then used as a guide, with nothing opposite. The bend 8 extends from one edge of the channel 9, in such a way that the capsules 2, once in contact against the bend 8, are correctly referenced for an inlet in the channel 9 of adjusted shape. A centrifugal referencing of the capsules 2 against the bend 8 is thus obtained.

The absence of a counter-guide opposite the bend 8 prevents jamming, and the inertia of the capsules 2 nevertheless ensures that they are flattened against the bend 8 and therefore are at least guided by it. The capsules 2 that are not in contact with the bend 8 in the area of the opening of the channel 9 therefore quite simply cannot enter into said channel 9 and can be separated from it freely and without jamming, since the bend 8 is a guide with nothing opposite.

It will be understood that the horizontal distance between, on the one hand, the lateral opening 12 of the belt 4, and, on the other hand, the opening of the channel 9 influences the minimum horizontal speed that a capsule 2 is to have during the passage through said opening 12 to effectively reach the channel 9. Below this speed, the capsules cannot reach the channel 9. Starting from this speed and above, the capsules 2 come into contact with the bend 8 that defines their path upward and elongate it by circulating against it up to the opening of the channel 9. The higher the initial horizontal speed of the capsule 2, the longer will be its travel against the bend 8 before the inlet of the channel 9.

The bend 8 can therefore follow the shape of the free fall between the outlet opening 12 and the inlet of the channel 9, with the corresponding horizontal speed. If the horizontal speed is higher, the capsule 2 then arrives gently and early upon contact with the bend 8, which guides it up to the inlet of the channel 9.

In a general way, the inertia of the capsule 2 brings it against the bend 8, with the latter acting as a guide surface with nothing opposite and then limiting the jamming, up to the inlet of the channel 9, with the capsule 2 moving freely under the action of its inertia between, on the one hand, the belt 4, from where it is ejected by the ejection means 13, and, on the other hand, the inlet of the channel 9, where it then continues its movement, under the action of the gravity and even an active movement means. This general principle is therefore compatible with configurations where the inlet of the channel 9 is located at a higher height than the lateral outlet of the belt 4, as well as with configurations where the inlet of the channel 9 is located below.

The feed device 1 is also provided with an unloading flow 10 that ensures the return into the receiving tray 3 of the capsules 2 that cannot enter into the channel 9. The channel 9 preferably does not actually have an inlet whose cross-section decreases until it corresponds to the capsule 2 that is to be processed, which contributes to preventing high-speed jamming. Thus, only the capsules 2 that are correctly aligned against the bend 8 that extends from the channel 9 can circulate in said channel 9. The offset capsules 2 in relation to the bend 8 and that are therefore not correctly opposite the opening of the channel 9 cannot enter therein and should then be sent to the receiving tray 3, or hopper.

In the end part 7, the chute 6 then has a separator 11, opposite the bend 8 at the inlet to the channel 9. This separator 11 promotes the separation in relation to the channel 9 of the capsules 2 that are not correctly opposite it. This separator 11 ensures a guiding that tends to push back the capsules 2 that are not against the bend 8. The separator 11 forms the separation end between, on the one hand, the channel 9, and, on the other hand, the unloading flow 10. One of its edges extends opposite the final end of the bend 8, beside the channel 9, whereas the other of its edges extends into the extension of the unloading flow 10. The separator 11 therefore ensures that the capsules 2 that are sent into the chute 6 by the ejection means 13 are sent either into the channel 9 or into the unloading flow 10.

In accordance with that which has been described above, the ejection means 13 creates for the capsules 2 a speed that is transverse to the advance of the belt 4 that is high enough so that once released in the end part 7 of the chute 6, they can reach the inlet of the channel 9, in particular owing to the guiding of the bend 8 against which they will circulate at least partially, if necessary.

In certain embodiments, the ejection means 13 assumes the shape of a pusher that will circulate transversely between the mountings 5, from one side to the other of the belt 4, to move the capsules 2 toward the opening 12. The speed of the capsules 2 during their passage through the opening 12 therefore corresponds to the travel speed of the ejection means 13. With the horizontal speed of the capsules 2 having to exceed a threshold below which they do not reach the inlet of the channel 9, the same holds true for the transverse speed of the ejection means 13, which is also to exceed a threshold.

In addition, since the pusher that forms the ejection means 13 circulates between two successive mountings 5 on the belt 4, the speed of its transverse movement is proportional to the speed of advance on the belt 4. Consequently, the speed of advance of the belt 4 is guided by a control unit that ensures a minimum speed so that the ejection means 13 of the pusher type can transmit to the capsules 2 a high enough speed so that their inertia brings them against the bend 8, which then directs them up to the inlet of the channel 9.

For the situations where a low flow rate of capsules 2 is required at the outlet of the feed device 1, consideration can therefore be given to operating the feed device 1, alternately, in a regime in which the capsules 2 are moving fast enough to reach the channel 9, optionally with a higher flow rate, and a regime where the capsules 2 will not go fast enough to reach it.

Owing to the invention, it is thus possible to reduce the energy that is necessary to the conveying of capsules and to prevent, owing to the referencing by inertia against the bend, possible jamming of capsules.

Although the description above is based on particular embodiments, it is in no way limiting of the scope of the invention, and modifications can be provided, in particular by substituting equivalent techniques or by a different combination of all or part of the characteristics that are developed above.

The invention claimed is:

1. A device (1) for supplying capsules (2), comprising:
   a receiving tray (3) for loose capsules (2);
   a belt (4) that is equipped with mountings (5), for conveying capsules (2) upward, during which poorly-oriented capsules are caused to be sent back toward the receiving tray (3);
   an outlet chute (6) for guiding the capsules (2) to a station that is being fed; and
   an ejection means (13) for guiding the capsules (2) into said chute (6) from a side of the belt (4),
   wherein the chute (6) comprises, on the belt side (4), an end part (7) where the capsules (2) are conveyed under the action of inertia and that has a guiding bend (8) with nothing opposite, the guiding bend (8) upwardly defining a capsule path,
   the chute (6) having, downstream from the end part (7), a channel (9) of a shape that maintains an orientation of the capsules (2) during circulation of the capsules (2) therethrough,
   the bend (8) extending from said channel (9) and having a shape of an arc, and a profile of the bend (8) extending along and above the path that an object made of a capsule (2) follows under sole action of gravity, between the outlet of the belt (4), where the capsule (2) moves at a horizontal speed, and the inlet of the channel (9), below and separated horizontally in relation to said outlet.

2. The device according to claim 1, further comprising:
an unloading flow (10), extending from the end part (7) of the chute (6), for receiving and releasing from said end part (7) capsules (2) that are not opposite the channel (9), said channel (9) having, at an end of the channel in an area of the end part (7) of the chute (6), a separator (11) that diverts the capsules (2) toward said unloading flow (10).

3. The device according to claim 1, further comprising:
a raised outlet opening (12), through which the capsules (2) travel after the capsules (2) are carried on the belt (4), and starting from which the chute (6) extends, with the ejection means (13) acting on the capsules (2) in an area of the belt (4) so that the capsules (2) pass through said opening (12) and then circulate freely up to the inlet of the channel (9), guided by the bend (8).

4. A method for supplying capsules (2) in a processing station, comprising:
raising the capsules (2) by conveying by means of a belt (4) that is equipped with mountings (5);
during the raising, eliminating poorly-oriented capsules;
at an end of the raising, releasing the capsules (2) from the belt (4) toward a channel (9) of a chute (6); and
conveying the capsules (2) within the channel (9) up to the processing station,
wherein said releasing of the capsules (2) toward the channel (9) essentially consists in permitting the capsules (2) to move freely after the belt (4) and up to the channel (9) along a path that is defined at least partially by a guiding bend (8), and
the capsules (2) are released toward the channel (9) by exerting a horizontal thrust upon the capsules (2) from the zone of the belt (4) up to a raised outlet opening (12), with the capsules (2) then circulating freely under action of gravity up to the channel (9).

5. The method according to claim 4, wherein a speed of the capsules (2) during release toward the chute (6) is such that the capsules come against the bend (8) at least for a part of the path in such a way as to obtain a positional referencing.

6. The method according to claim 5, further comprising:
sending, downstream from the belt (4), capsules (2) that are detected as not meeting a predefined criterion of speed back toward an unloading flow (10).

7. The method according to claim 5, further comprising:
sending, downstream from the belt (4), capsules (2) that are detected as not meeting a predefined criterion of orientation back toward an unloading flow (10).

8. The method according to claim 4, wherein the horizontal thrust of the capsules (2) and the vertical rise of the belt (4) are proportional and, during operation, greater than a respective lower threshold above which the capsules (2) circulate against at least one part of the bend (8).

9. The method according to claim 4, further comprising:
sending, downstream from the belt (4), capsules (2) that are detected as not meeting a predefined criterion of speed back toward an unloading flow (10).

10. The method according to claim 4, wherein the capsules (2) circulate freely under the action of gravity below the channel.

11. The method according to claim 4, further comprising:
sending, downstream from the belt (4), capsules (2) that are detected as not meeting a predefined criterion of orientation back toward an unloading flow (10).

* * * * *